United States Patent
Sekigawa et al.

(10) Patent No.: US 12,194,935 B2
(45) Date of Patent: Jan. 14, 2025

(54) VEHICLE AND VEHICULAR STATIC ELIMINATOR

(71) Applicant: TOYOTA JIDOSHA KABUSHIKI KAISHA, Aichi-ken (JP)

(72) Inventors: Yuya Sekigawa, Toki (JP); Toshio Tanahashi, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 20 days.

(21) Appl. No.: 18/459,370

(22) Filed: Aug. 31, 2023

(65) Prior Publication Data
US 2024/0083375 A1  Mar. 14, 2024

(30) Foreign Application Priority Data
Sep. 13, 2022 (JP) .................................. 2022-144983

(51) Int. Cl.
*B60R 16/06* (2006.01)
(52) U.S. Cl.
CPC .................................. *B60R 16/06* (2013.01)
(58) Field of Classification Search
CPC .................................................. B60R 16/06
USPC ....................................................... 361/216
See application file for complete search history.

(56) References Cited

U.S. PATENT DOCUMENTS

| | | | | |
|---|---|---|---|---|
| 5,073,425 A | * | 12/1991 | Dees, Jr. ................. | B32B 27/18 428/48 |
| 5,761,022 A | * | 6/1998 | Rankilor ................... | H05F 3/00 361/220 |
| 2005/0018375 A1 | * | 1/2005 | Takayanagi ............. | H01T 23/00 361/212 |
| 2016/0280162 A1 | * | 9/2016 | Yamada ................. | B62D 35/00 |
| 2017/0297634 A1 | * | 10/2017 | Han ..................... | H05H 1/2439 |
| 2022/0073022 A1 | * | 3/2022 | Sakurai ................... | H05F 3/00 |

FOREIGN PATENT DOCUMENTS

| | | |
|---|---|---|
| JP | 6168157 B2 | 7/2017 |
| JP | 2020042928 A * | 3/2020 |

OTHER PUBLICATIONS

Machine translation of Ito et al. Japanese Patent Document JP 2020-42928 A Mar. 2020 (Year: 2020).*

* cited by examiner

*Primary Examiner* — Kevin J Comber
(74) *Attorney, Agent, or Firm* — HAUPTMAN HAM, LLP (57) ABSTRACT

During traveling of a vehicle body, a vehicle is provided with a vehicular static eliminator including a self-discharge static eliminating device that is attached to an outer surface of a lid of a fuse box mounted to a front compartment with a front grill, and a coversheet overlapped with an external surface of the self-discharge static eliminating device, in which the fuse box is disposed close to a hood and the coversheet includes Japanese paper.

12 Claims, 9 Drawing Sheets

VEHICLE AND VEHICULAR STATIC ELIMINATOR

CROSS REFERENCE TO RELATED APPLICATION

This application claims priority to Japanese Patent Application No. 2022-144983 filed on Sep. 13, 2022, which is incorporated herein by reference in its entirety including the specification, claims, drawings, and abstract.

TECHNICAL FIELD

The present disclosure relates to a configuration of a vehicular static eliminator that reduces the potential of a vehicle body and a control instrument, and to a configuration of a vehicle to which the vehicular static eliminator is attached.

BACKGROUND

In vehicles, static electricity is generated in electric circuits connected to auxiliary machines such as a driving motor and a battery in some cases. The vehicle is grounded with tires made of rubber, and the generated static electricity cannot flow in a road surface, and the electric circuit and the vehicle body are charged. Further, the charged static electricity affects the control instruments of the vehicle, and a traveling performance of the vehicle is affected in some cases.

Therefore, there is disclosed a method in which a sheet-shaped self-discharge static eliminating device including a conductive layer and a discharge layer is attached to a top surface of a case that contains a positive electrode circuit such as a battery, and neutralizes and eliminates a positive electric charge on the case outer surface, thereby improving a traveling performance of a vehicle (for example, see JP2020-042928 A).

Moreover, there is disclosed a method of improving the aerodynamic performance and the steering stability of a vehicle in which air ionization self-discharge neutralization static eliminating devices are attached to a negative electrode terminal of an auxiliary machine battery having a negative electrode grounded to a vehicle body and a positive electrode that supplies electric power to auxiliary machines via a fuse box, and to an outer surface of a battery case, thereby reducing positive static electricity charged on a surface of the vehicle body and reducing a repulsive force between the vehicle body and the air flow (for example, see JP 6168157 B).

SUMMARY

Meanwhile, by using the method described in JP 2020-042928 A, when electric charges of outer surfaces of containing cases of an interface terminal, a fuse, and a relay that are mounted in a front compartment are eliminated by corona self-discharge in such a manner that an external air flowing through the front compartment is changed into negative ions and the negative ions are neutralized and eliminated by being attracted to the positive electric charges on the outer surfaces, a hood that covers the front compartment is charged with the static electricity in some cases. Therefore, there is room for improving the static electricity charged on the hood.

Therefore, the present disclosure aims to reduce the charged potential of a vehicle body and a control instrument, thereby causing the vehicle to exhibit an original control performance and exhibit an original aerodynamic performance.

A vehicular static eliminator according to the present disclosure includes: a self-discharge static eliminating device that is attached to an outer surface of an instrument mounted in a vehicle body; and a coversheet that is overlapped with an external surface of the self-discharge static eliminating device and covers the external surface, and covers side end surfaces of the self-discharge static eliminating device, in which the coversheet includes natural fiber.

The coversheet including the natural fiber is overlapped with the self-discharge static eliminating device, so that it is possible to reduce the charged potential on the vehicle body by maintaining the potential of the outer surface of the instrument to the potential corresponding to zero and reducing the electrostatic induction from the instrument to the vehicle body. Accordingly, it is possible to improve the original control performance of the vehicle, and to cause the vehicle to exhibit the original aerodynamic performance by preventing the generation of the separated flow on the vehicle body surface.

In the vehicular static eliminator of the present disclosure, the coversheet may include an adhesive layer, and may be stuck to the external surface of the self-discharge static eliminating device and the outer surface of the instrument via the adhesive layer.

In this manner, the coversheet is stuck to the instrument and the self-discharge static eliminating device via the adhesive layer having air permeability, whereby it is possible to decrease the electrostatic potential of the vehicle body and the control instrument with a simple configuration.

In the vehicular static eliminator of the present disclosure, a plurality of the coversheets each including the adhesive layer and being overlapped with each other may be stuck to the external surface of the self-discharge static eliminating device and the outer surface of the instrument, and a total thickness of the plurality of the coversheets may be 0.1 to 0.2 mm.

When the moisture-retaining property and the air permeability of the coversheet become high, the potential of the vehicle body and the control instrument decreases. When the total thickness of the coversheets overlapped with each other to some extent becomes thick, the moisture-retaining property of the entire coversheet becomes high and the potential of the vehicle body decreases. Meanwhile, when the total thickness becomes excessively thick, the air permeability of the entire coversheet is lowered, and the potential of the vehicle body and the control instrument does not decrease. Further, the reduction of the potential of the vehicle body is maximized in a case where the total thickness is 0.1 to 0.2 mm. Therefore, the total thickness is set to 0.1 to 0.2 mm, whereby it is possible to effectively lower the potential of the vehicle body and the control instrument.

In the vehicular static eliminator of the present disclosure, a circumferential edge portion of the coversheet may be fixed to the outer surface of the instrument at outer sides of the self-discharge static eliminating device to sandwich the self-discharge static eliminating device between the coversheet and the instrument.

Accordingly, the vehicular static eliminator can be formed with a simple configuration in which only the circumferential edge portion of the coversheet is fixed to the instrument, and the coversheet is not fixed to the self-discharge static eliminating device.

In the vehicular static eliminator of the present disclosure, the coversheet may include Japanese paper or cotton nonwoven fabric.

The coversheet includes a general material such as Japanese paper or cotton, so that it is possible to reduce cost.

A vehicle according to the present disclosure includes: an instrument mounted in a vehicle body; and a vehicular static eliminator including a self-discharge static eliminating device that is attached to an outer surface of the instrument, and a coversheet that is overlapped with an external surface of the self-discharge static eliminating device and covers the external surface, and covers side end surfaces of the self-discharge static eliminating device, in which the instrument is disposed close to a structure member of the vehicle body, and the coversheet includes natural fiber.

The coversheet including the natural fiber is overlapped with the self-discharge static eliminating device, so that it is possible to reduce the charged potential on the vehicle body by maintaining the potential of the instrument to the potential corresponding to zero and reducing the electrostatic induction to a structure member of the vehicle body close to the instrument. Accordingly, it is possible to cause the vehicle to exhibit the original control performance, and to cause the vehicle to exhibit the original aerodynamic performance by preventing the generation of the separated flow on the vehicle body surface.

In the vehicle of the present disclosure, the instrument may include at least one of a fuse box, a battery, and an inverter being mounted in a front compartment of the vehicle body, whose top surface is covered with a hood, and the fuse box, the battery, and the inverter may be disposed close to the hood, and the vehicular static eliminator may be attached to at least one of a lid of the fuse box, a lid or a side surface of a battery case that contains the battery, and a lid of an inverter case that contains the inverter.

Accordingly, it is possible to maintain the potential on the outer surfaces of the fuse box, the battery, and the inverter to the potential corresponding to zero, and to reduce the charged potential on the hood by reducing the electrostatic induction to the hood that is disposed close to the fuse box, the battery, and the inverter. Accordingly, it is possible to cause the vehicle to exhibit the original control performance, and to cause the vehicle to exhibit the original aerodynamic performance by preventing the generation of the separated flow on the hood surface.

In the vehicle of the present disclosure, the coversheet may include Japanese paper or cotton nonwoven fabric.

The coversheet includes a general material such as Japanese paper or cotton, so that it is possible to reduce cost.

The present disclosure can cause the vehicle to exhibit the original control performance by reducing the charged potential on the vehicle body and the control instrument, and can cause the vehicle to exhibit the original aerodynamic performance.

BRIEF DESCRIPTION OF DRAWINGS

Embodiment(s) of the present disclosure will be described based on the following figures, wherein.

DESCRIPTION OF EMBODIMENTS

Hereinafter, a vehicle 100 according to an embodiment, and vehicular static eliminators 32, 33, and 34 in the embodiment will be described with reference to the drawings. An arrow FR, an arrow UP, and an arrow RH illustrated in the respective drawings respectively indicate a front side, an upper side, and a right side of the vehicle 100. Moreover, opposite directions of the respective arrows FR, UP, and RH respectively indicate a rear side, a lower side, and a left side. Hereinafter, when a description is made simply using front and rear, left and right, and up and down directions, unless otherwise specified, front and rear, left and right, and up and down respectively indicate front and rear in the front-and-rear direction, left and right in the left-and-right direction, and up and down in the up-and-down direction of the vehicle 100.

Figure 1:
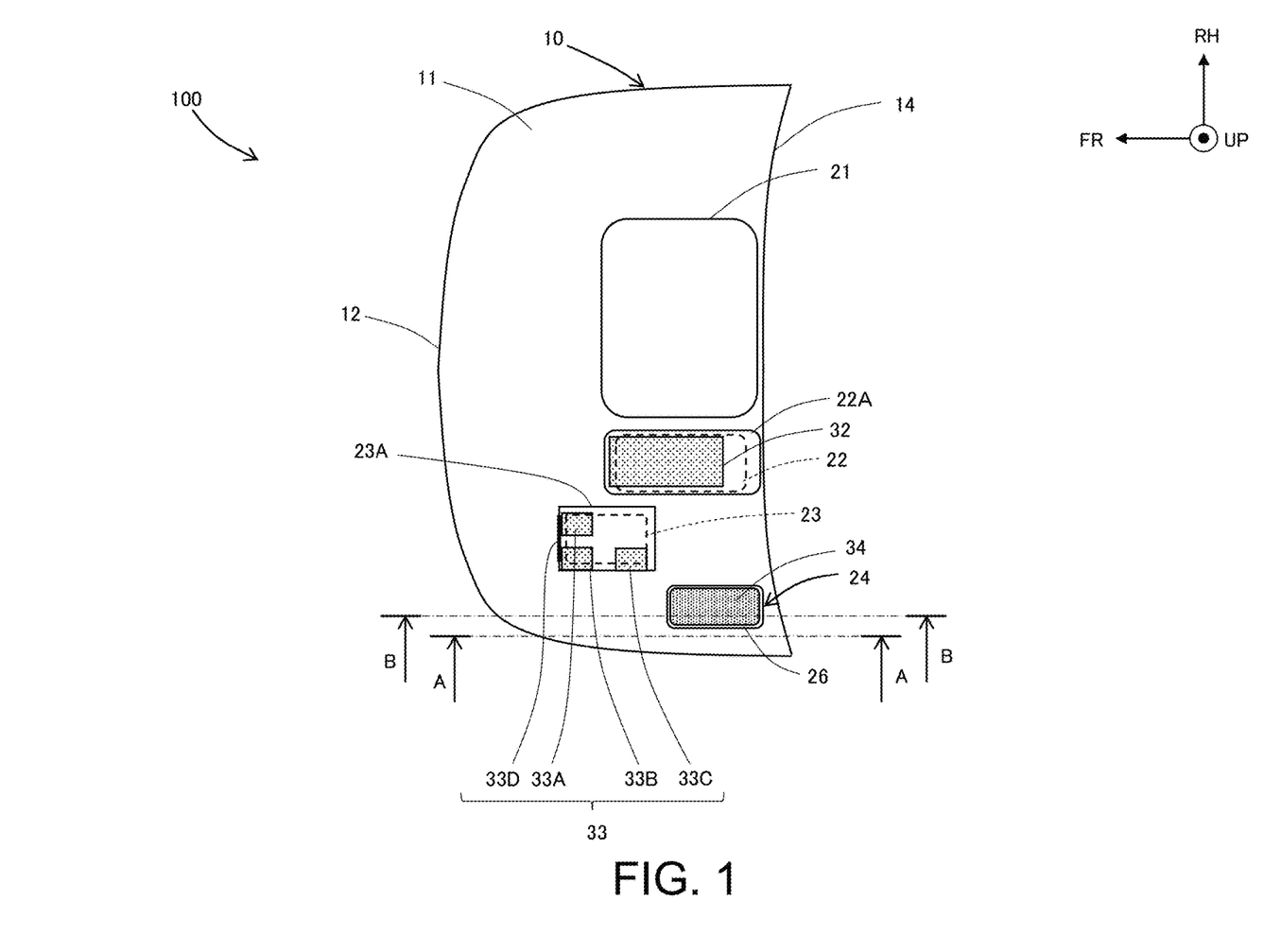
FIG. 1 is a plan view illustrating an opened state of a hood of a front compartment of a vehicle to which a vehicular static eliminator according to an embodiment is mounted.
Figure 2:
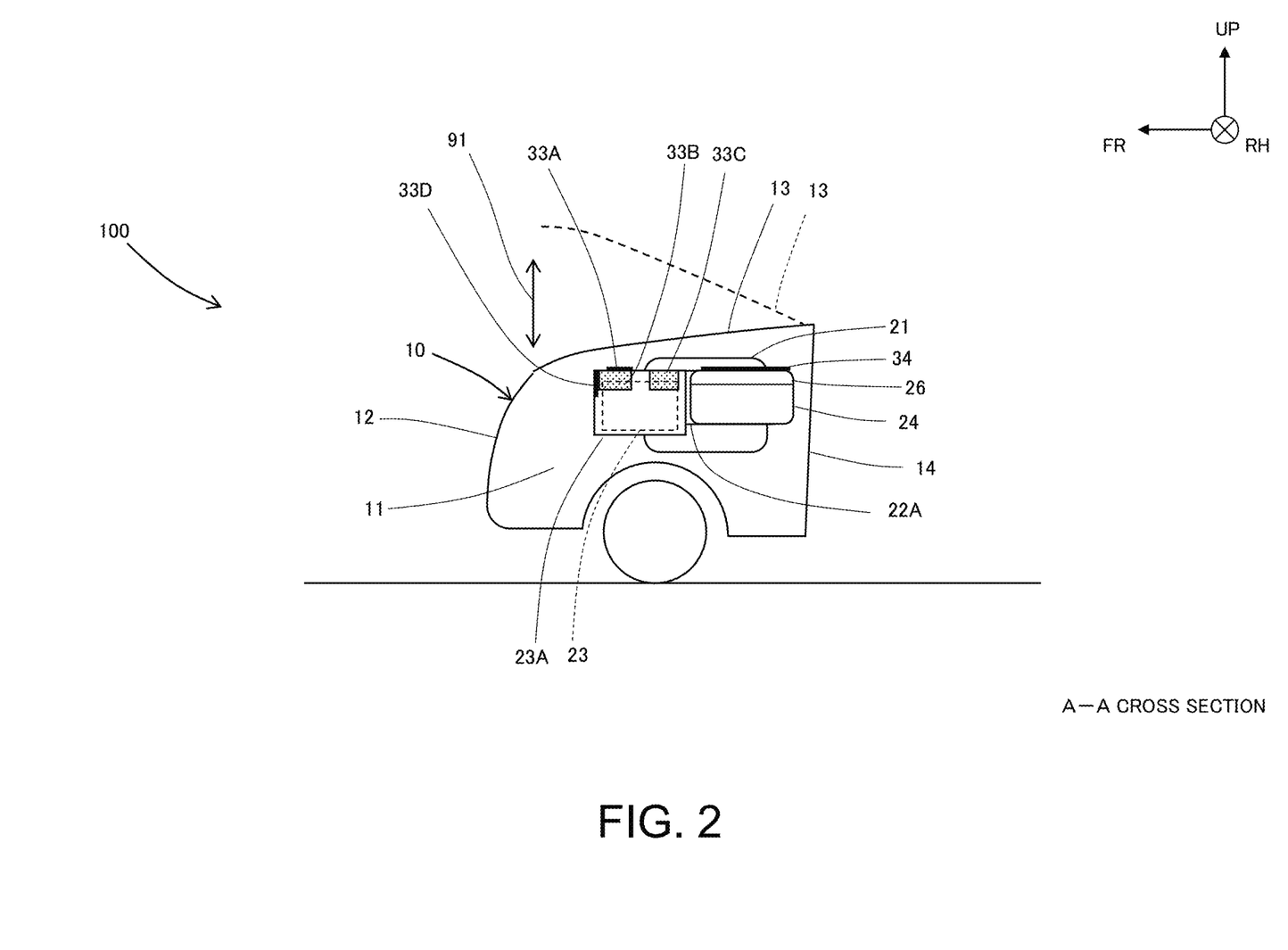
FIG. 2 is a cross-sectional view of the front compartment of the vehicle to which the vehicular static eliminator in the embodiment is mounted, and is an A-A cross section illustrated in FIG. 1.

As illustrated in FIG. 1, a front compartment 11 is provided in a front part of the vehicle 100. The front compartment 11 is an internal space of a vehicle body 10 which is provided in a front part of a dash panel 14, and includes a top surface that is covered with a hood 13 serving as a structure member of the vehicle 100. In the front compartment 11, there are mounted a drive unit 21 including a motor, an engine, and the like, an inverter 22 that converts direct-current power of a high-pressure battery (not illustrated) into alternating-current power and supplies the alternating-current power to the motor of the drive unit 21, an auxiliary machine battery 23, and a fuse box 24. As illustrated in FIG. 2, the hood 13 includes a rear end portion that is rotatably fixed to the vehicle body 10, and a front end that opens upward and downward to open and close the front compartment 11 as illustrated by an arrow 91. The hood 13 includes an outer panel 13A and an inner panel 13B (see FIG. 4). Respective top surfaces of the inverter 22, the battery 23, and the fuse box 24 are mounted in the front compartment 11 so as to be close to the hood 13 when the hood 13 is closed. Note that, although an instrument such as a radiator other than the above-mentioned instruments is mounted in the front compartment 11, illustration thereof is omitted.

Referring back to FIG. 1, the vehicular static eliminators 32 and 34 are respectively attached to a top surface of a lid of an inverter case 22A made of metal that contains the inverter 22 and a top surface of a lid 26 of the fuse box 24 made of resin. Moreover, as illustrated in FIGS. 1 and 2, the vehicular static eliminator 33 is attached to a battery case 23A made of resin that contains the auxiliary machine battery 23. The vehicular static eliminator 33 includes a vehicular static eliminator 33A that is attached to a top surface of a lid of the battery case 23A, vehicular static eliminators 33B and 33C that are respectively attached in an L-character shape to the lid and a left side surface of the battery case 23A, and a vehicular static eliminator 33D that is attached to a front side surface of the battery case 23A.

Next, with reference to FIGS. 3 and 4, details of the fuse box 24, and the vehicular static eliminator 34 attached to the top surface of the lid 26 of the fuse box 24 will be described.

Figure 3:
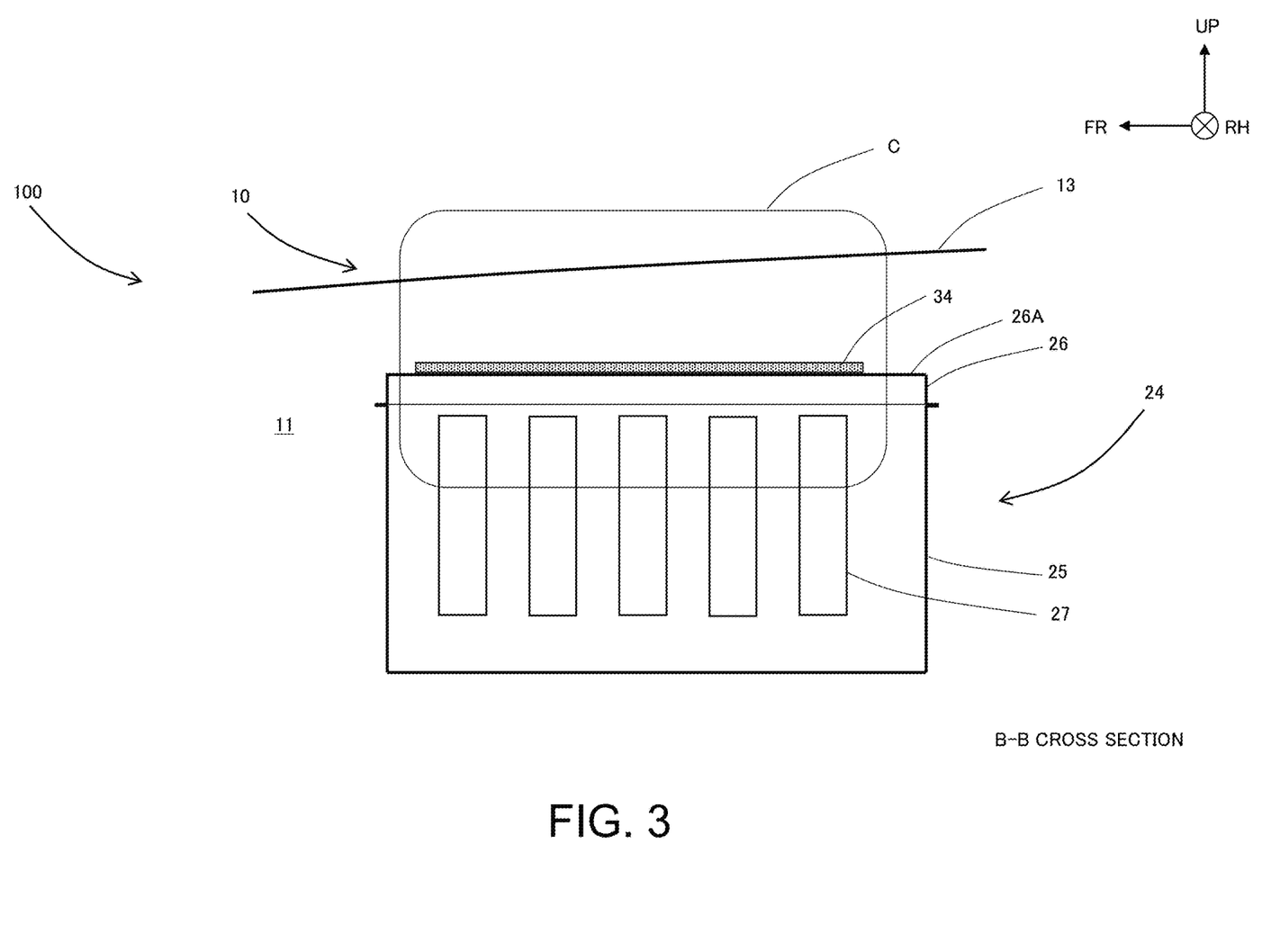
FIG. 3 is a cross-sectional view of a fuse box to which the vehicular static eliminator in the embodiment is attached, and is a B-B cross section illustrated in FIG. 1.

As illustrated in FIG. 3, the fuse box 24 includes a main body 25 made of resin, and the lid 26 made of resin that is attached to a top surface of the main body 25. A plurality of fuses 27 are contained in an interior of the main body 25. The vehicular static eliminator 34 is attached to an outer surface 26A at an upper side of the lid 26.

Figure 4:
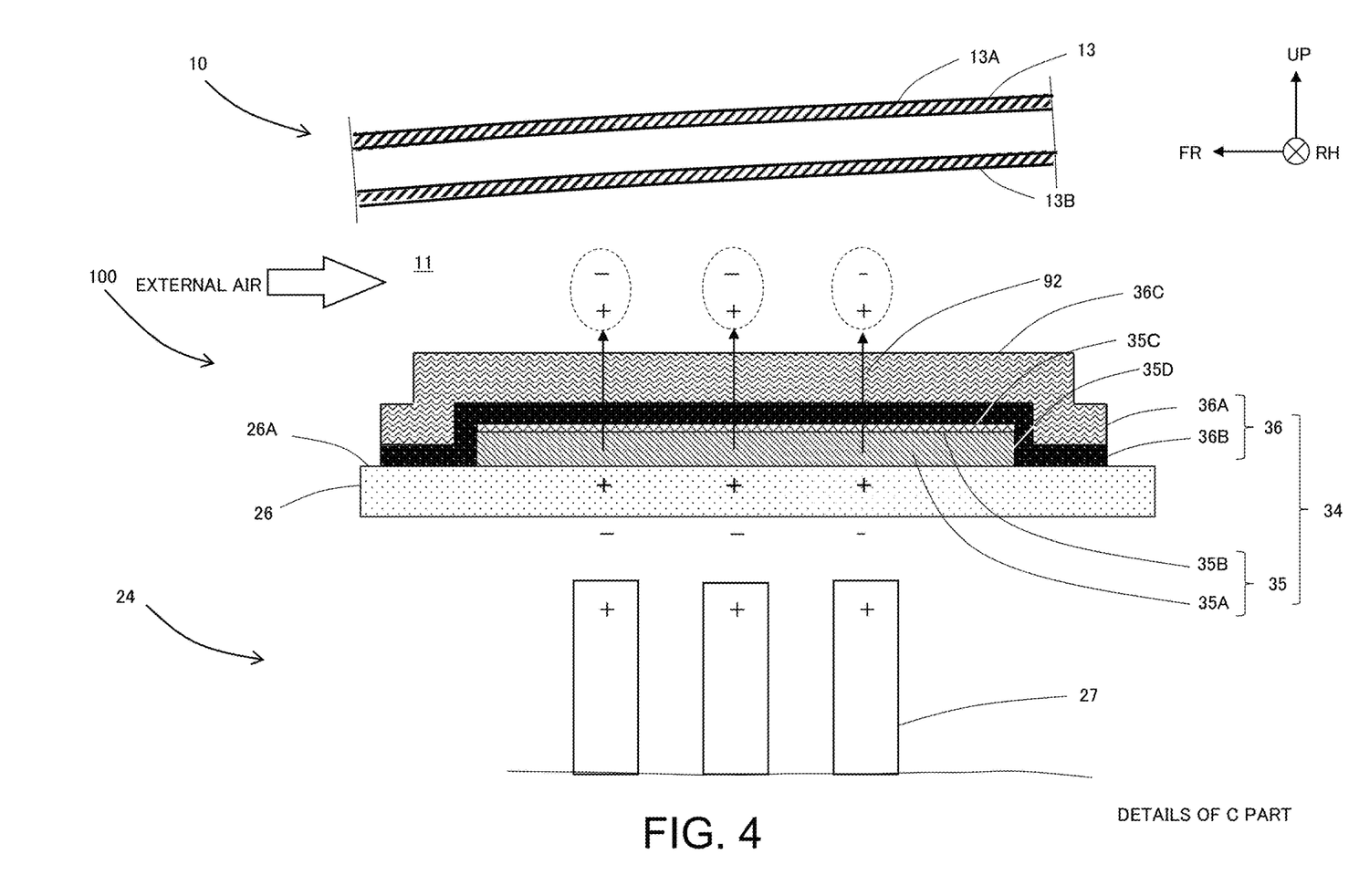
FIG. 4 is a schematic cross-sectional view of the vehicular static eliminator attached to a lid of the fuse box, and a hood, and is a detailed view of a C part illustrated in FIG. 3.

As illustrated in FIG. 4, the vehicular static eliminator 34 includes a sheet-shaped self-discharge static eliminating device 35, and a coversheet 36 that covers an outer surface 35C and side end surfaces 35D of the self-discharge static eliminating device 35.

The self-discharge static eliminating device 35 includes a conductive aluminum adhesive tape 35A, and a metallic coated film 35B that is applied onto the aluminum adhesive tape 35A. The metallic coated film 35B is a thin film to which a metallic coating material including a fine metal material is applied. It is considered that the metal material that is included in the metallic coated film 35B has a shape in which a disk is curved so as to have a U-character cross section, and corona discharge is generated from an edge thereof. Accordingly, the metallic coated film 35B includes a discharge layer that causes generation of corona discharge, and the self-discharge static eliminating device 35 is an air ionization self-discharge neutralization static eliminating device.

The coversheet 36 includes Japanese paper 36A and an adhesive layer 36B. The Japanese paper 36A includes natural fiber having a moisture-retaining property and air permeability. The adhesive layer 36B bonds the Japanese paper 36A to the outer surface 35C and the side end surfaces 35D of the self-discharge static eliminating device 35, and the outer surface 26A of the lid 26. The adhesive layer 36B has air permeability. An outer surface 36C of the coversheet 36 is in contact with an external air that flows in the front compartment 11.

Next, functions and effects achieved by the vehicular static eliminator 34 configured as described in the foregoing will be described. As illustrated in FIG. 4, upper ends of the fuses 27 that are contained in the fuse box 24 are charged with positive static electricity. With the electrostatic induction of this positive static electricity, a lower surface of the lid 26 of the fuse box 24 is charged with negative static electricity, and with the electrostatic induction, the outer surface 26A at the upper side of the lid 26 is charged with positive static electricity.

The positive static electricity charged on the outer surface 26A at the upper side of the lid 26 reaches the metallic coated film 35B through the aluminum adhesive tape 35A. Then, corona discharge is generated from the top surface (an edge protrusion on the outer surface 35C of the self-discharge static eliminating device 35) of the metallic coated film 35B and edge protrusions on the side end surfaces 35D of the aluminum adhesive tape 35A. Since the adhesive layer 36B and the Japanese paper 36A have air permeability, as illustrated by arrows 92 in FIG. 4, in accordance with the charge amount of positive electrostatic charge, external air having flowed in the front compartment 11 from a front grill 12 is changed to negative ions, and the negative ions are attracted to surroundings of the outer surface 35C and the edge protrusions on the side end surfaces 35D of the aluminum adhesive tape 35A that are the corona discharge protrusions of the positive electrostatic potential. The attracted negative ions are then neutralized and eliminated with the positive electrostatic potential of the lid 26 passed through the coversheet 36 having air permeability, so that the potential of the lid 26 can be reduced to the vicinity of zero.

Here, the reason why the potential of the hood 13 is maintained to the potential corresponding to zero is not clearly identified, but is considered as follows. In the vehicular static eliminator 34 in the embodiment, the surface potential of the lid 26 decreases to zero potential by the self-discharge static eliminating device 35. The Japanese paper 36A of the coversheet 36 has an adequate thickness with air permeability and the moisture-retaining property, so that the moisture included in the external air is stably retained. The conductive effect of the moisture included in the Japanese paper 36A maintains the surface potential of the lid 26 to zero potential. Here, it is considered that the coversheet 36 has an adequate thickness with the light blocking effect that hides the corona discharge protrusion, so that the electrostatic induction to the hood 13 is prevented, to thereby maintain the potential of the hood 13 to the potential corresponding to zero. This will be described in detail later with reference to FIG. 9.

Figure 5:
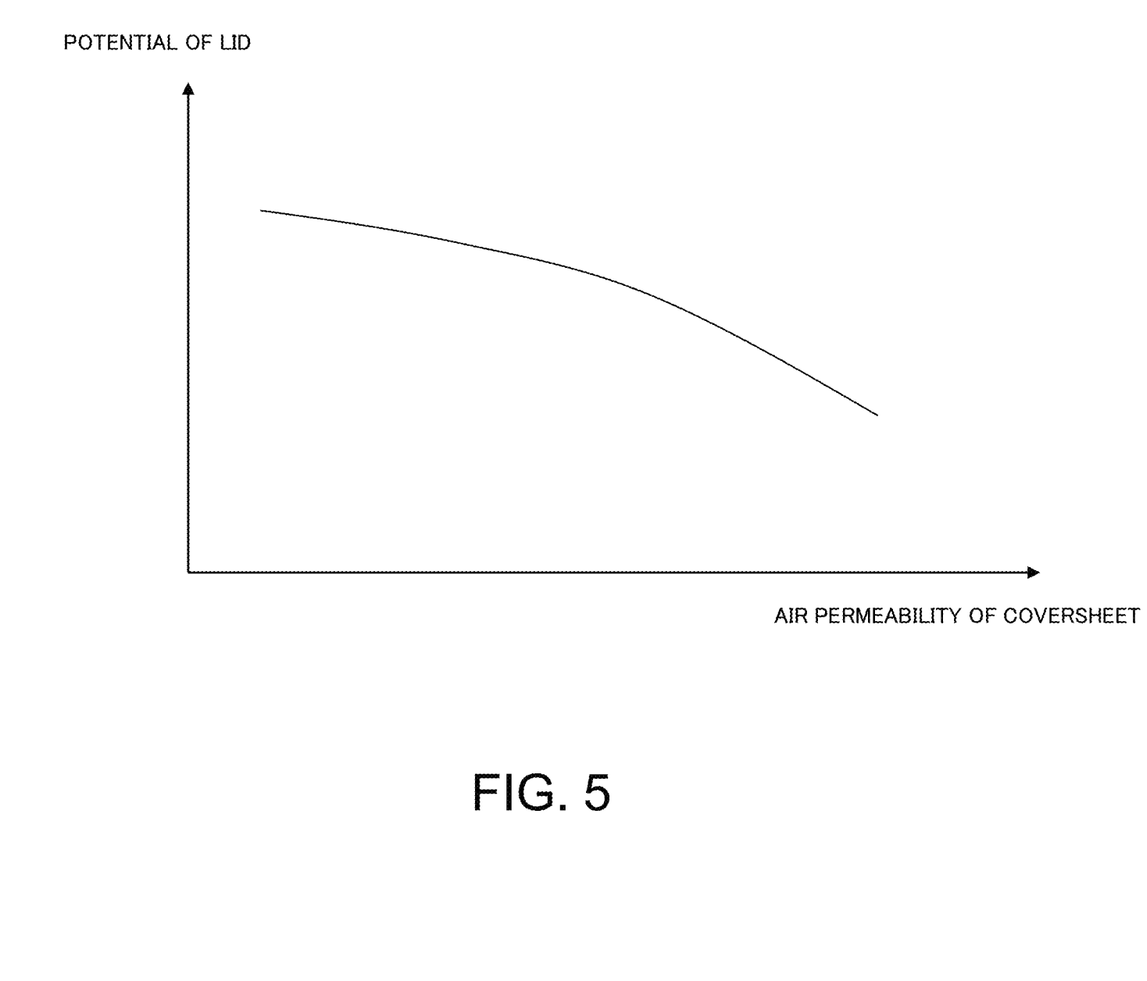
FIG. 5 is a graph illustrating a relation between air permeability of a coversheet, and the potential of the lid of the fuse box.
Figure 6:
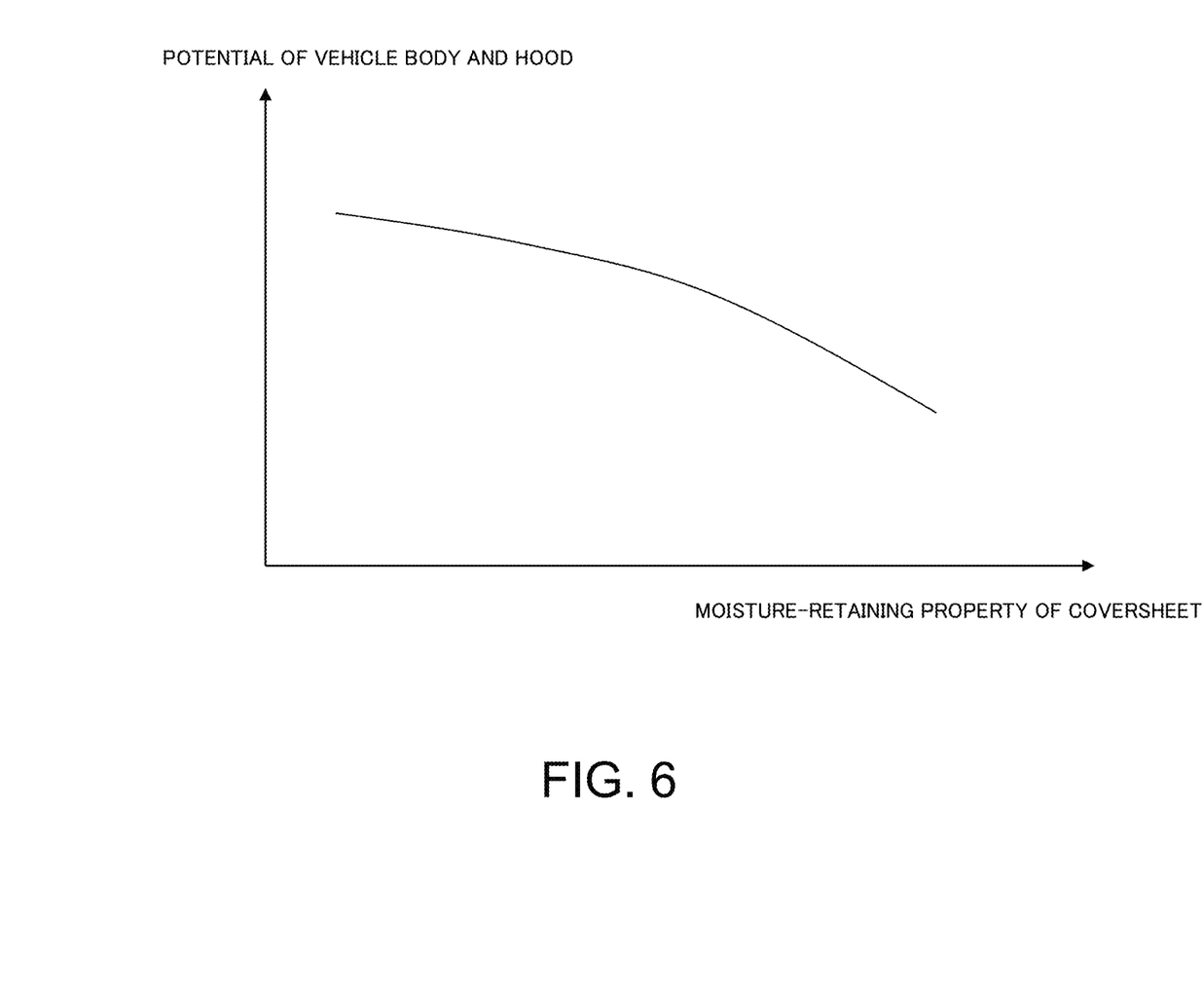
FIG. 6 is a graph illustrating a relation between a moisture-retaining property of the coversheet, and the potential of a vehicle body and the hood.

Here, with reference to FIGS. 5 and 6, a change in the potential of the lid 26 and the vehicle body 10 with respect to the air permeability and the moisture-retaining property of the coversheet 36 will be described. According to the research by the inventor, as illustrated in FIG. 5, it is revealed that as the air permeability of the coversheet 36 becomes large, the potential of the vehicle body 10 and the lid 26 decreases. In addition, as illustrated in FIG. 6, it is revealed that as the moisture-retaining property of the coversheet 36 becomes large, the potential of the vehicle body 10 and the hood 13 decreases.

Accordingly, it is understood that the air permeability and the moisture-retaining property of the coversheet 36 are necessary in order to exhibit the functions and effects as described in the foregoing.

Figure 7:
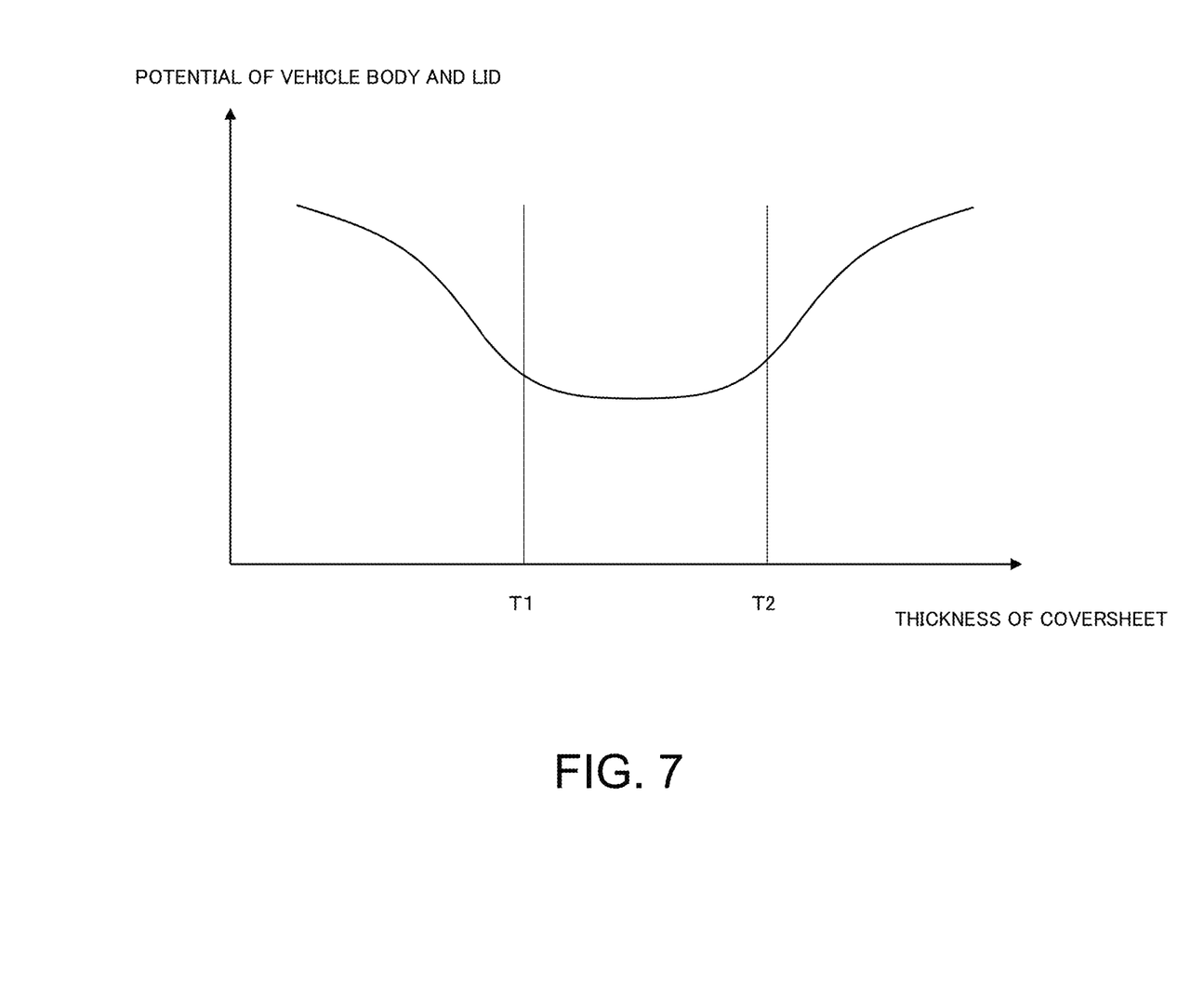
FIG. 7 is a graph illustrating a relation between the thickness of the coversheet, and the potential of the vehicle body and the lid of the fuse box.

Moreover, according to the research by the inventor, as illustrated in FIG. 7, it is revealed that when a plurality of the coversheets 36 are overlapped with each other to make the total thickness of the coversheet 36 thick, the potential of the lid 26 lowers, and when the number of the coversheets 36 to be overlapped with each other is further increased to make the total thickness of the coversheet 36 thicker, the potential of the vehicle body 10 rises. Further, it is also revealed that the potential of the vehicle body 10 and the lid 26 becomes the lowest in a case where the total thickness when the plurality of the coversheets 36 are overlapped with each other is 0.1 to 0.2 mm.

This can be considered that when the number of the coversheets 36 to be overlapped with each other is increased, the coversheets 36 have the increased moisture-retaining amount and the thickness that hides the corona discharge protrusions to lower the potential of the vehicle body 10 and the hood 13, however, the air permeability of the coversheets 36 lowers with the excessive number of the coversheets 36 to be overlapped with each other, so that the potential of the lid 26 conversely rises.

Next, with reference to FIG. 9, functions and effects achieved by the vehicular static eliminator 34 in the embodiment will be described, in comparison with a case as in JP2020-042928 A where the self-discharge static eliminating device 35 is attached to the outer surface 26A of the lid 26 of the fuse box 24 without attaching the coversheet 36 thereto.

Figure 9:
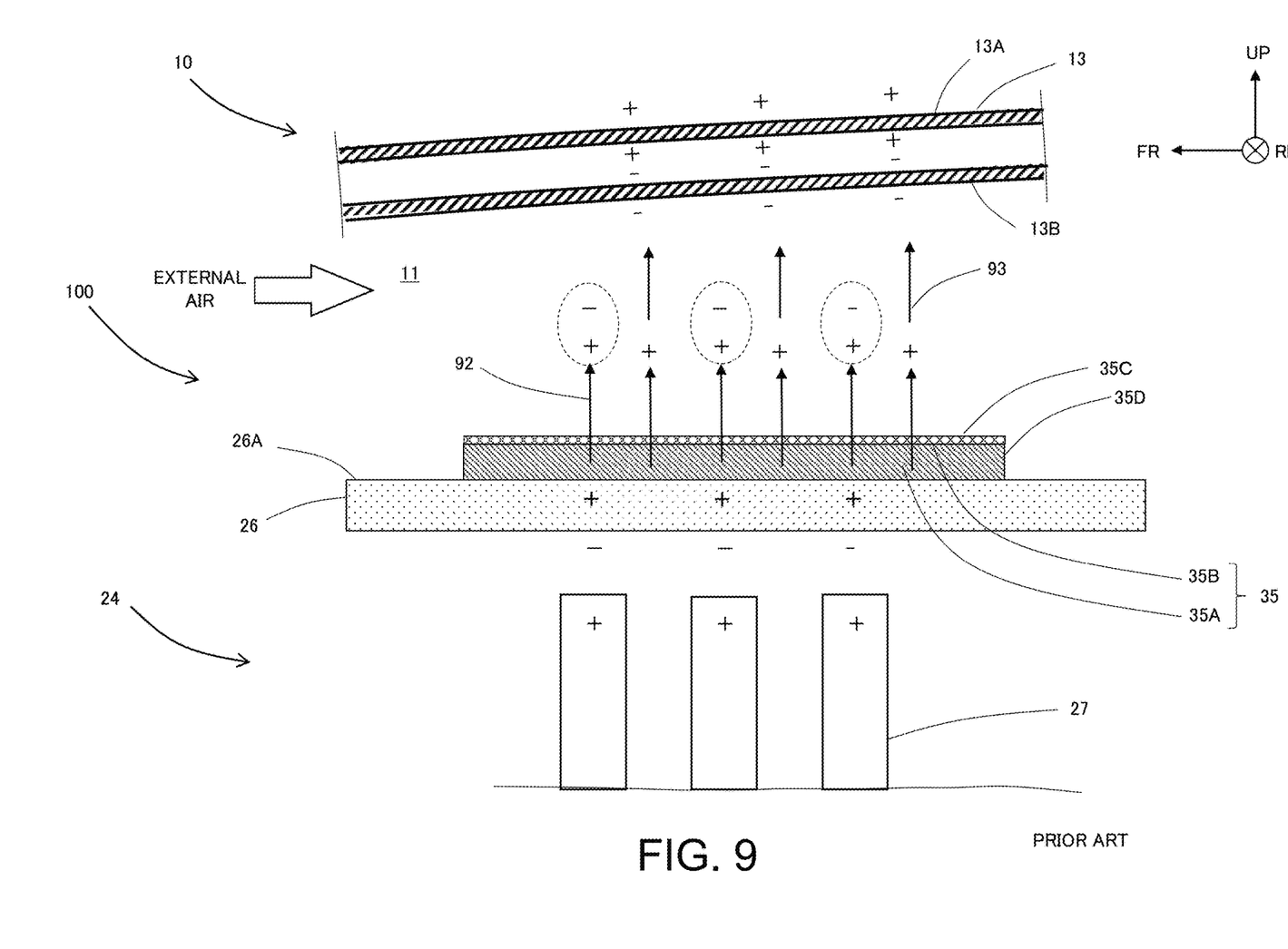
FIG. 9 is a schematic cross-sectional view illustrating a vehicular static eliminator in the related art attached to a lid of a fuse box, and a hood.

As illustrated in FIG. 9, in a case where the self-discharge static eliminating device is attached to the lid 26 of the fuse box 24, and the coversheet 36 is not provided, a phenomenon in which the potential of the vehicle body 10 increases occurs. The reason for this is not clearly identified, but is considered as follows.

In the case where the self-discharge static eliminating device 35 is attached to the lid 26 of the fuse box 24, and the coversheet 36 is not provided, similar to the previous description with reference to FIG. 4, with the positive static electricity charged on the outer surface 26A at the upper side of the lid 26, corona discharge is generated from the top surface (the edge protrusion on the outer surface 35C of the self-discharge static eliminating device 35) of the metallic coated film 35B and the edge protrusions on the side end surfaces 35D of the aluminum adhesive tape 35A. In the case where the coversheet 36 is not provided, as illustrated in FIG. 9, the corona discharge protrusions can be seen from the hood 13 side when the corona discharge has been generated, so that electrostatic induction 93 to the inner panel 13B of the hood 13 is generated by corresponding to the corona discharge potential in accordance with the positive electrostatic charge. Accordingly, the inner panel 13B of the hood 13 has negative potential. Further, it is considered that the outer panel 13A is charged with the positive static electricity due to the electrostatic induction of the air or a heat insulating material between the inner panel 13B and the outer panel 13A. Accordingly, it is considered that the potential of the vehicle body 10 rises.

Meanwhile, as has been described previously, in the vehicular static eliminator 34 in the embodiment, the surface potential of the lid 26 lowers to zero potential by the self-discharge static eliminating device 35, and the surface potential of the lid 26 is maintained to zero potential by the conductive effect of the moisture included in the Japanese paper 36A of the coversheet 36. In addition, the coversheet 36 has an adequate thickness with a light blocking effect that hides the corona discharge protrusions, so that the electrostatic induction to the hood 13 is prevented. As a result, it is considered that the hood 13 is prevented from being charged by the electrostatic induction, and an effect of reducing the potential of the vehicle body 10 is exhibited.

Next, with reference to FIG. 8, a vehicular static eliminator 34A according to another embodiment will be described. The same reference numerals are assigned to the same portions as the vehicular static eliminator 34 described previously with reference to FIG. 4, and repeated descriptions thereof are omitted.

Figure 8:
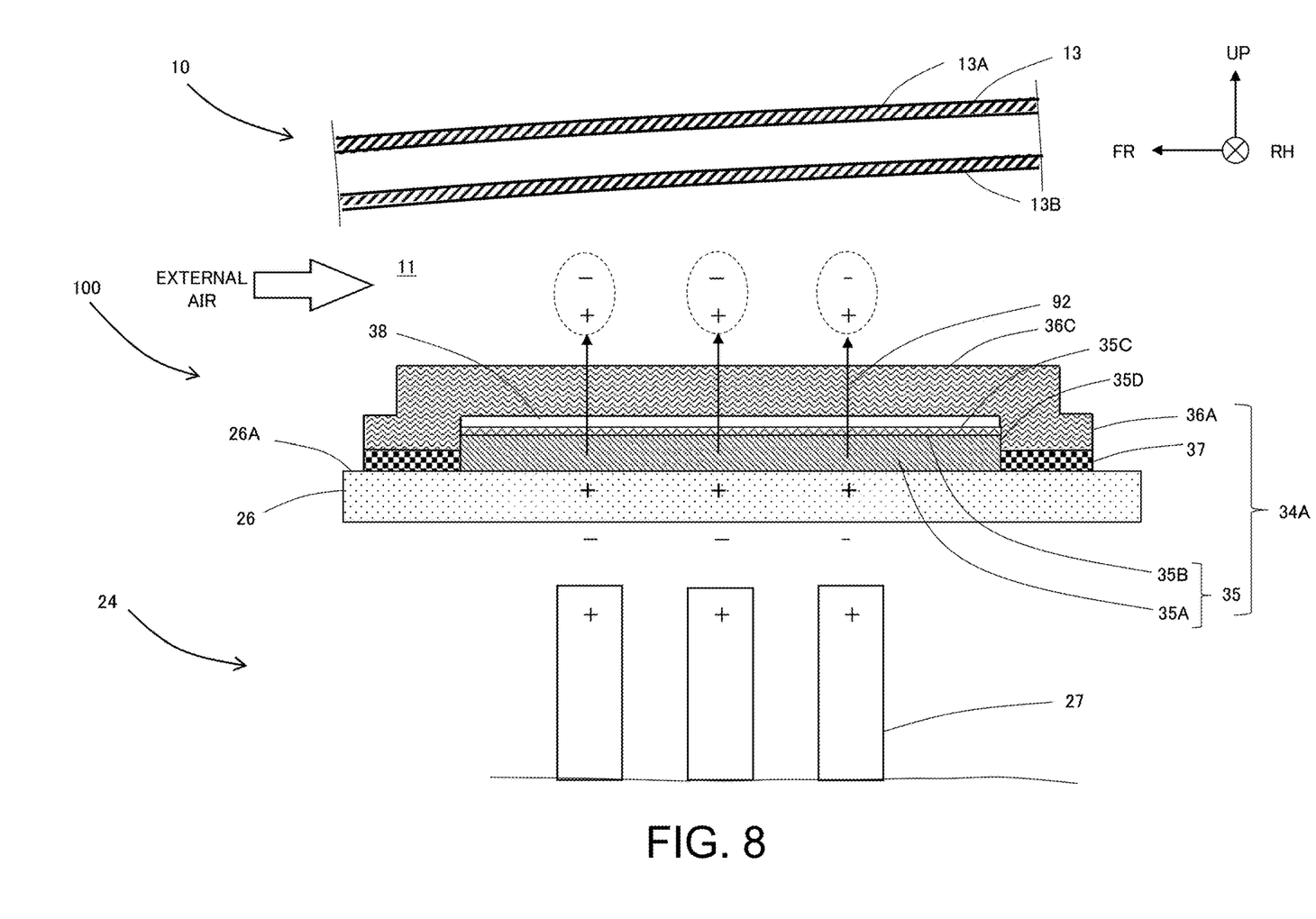
FIG. 8 is a schematic cross-sectional view illustrating a vehicular static eliminator according to another embodiment attached to a lid of a fuse box, and a hood.

As illustrated in FIG. 8, the vehicular static eliminator 34A is not provided with the adhesive layer 36B, and the coversheet 36 includes only the Japanese paper 36A. Further, a circumferential edge portion of the Japanese paper 36A is fixed to the outer surface 26A of the fuse box 24 with an adhesive 37, and the self-discharge static eliminating device 35 is sandwiched between a lower surface of the Japanese paper 36A and the outer surface 26A at an upper side of the fuse box 24. Here, the outer surface 35C of the self-discharge static eliminating device 35 may be brought into contact with the Japanese paper 36A, or a slight gap 38 may be generated between the outer surface 35C of the self-discharge static eliminating device 35 and the Japanese paper 36A.

A thin air layer is generated between the lower surface of the Japanese paper 36A of the vehicular static eliminator 34A and the outer surface 26A at the upper side of the fuse box 24 to obtain a configuration having air permeability, similar to the adhesive layer 36B. The vehicular static eliminator 34A exhibits functions and effects similar to those by the vehicular static eliminator 34 described previously.

In the foregoing, the configuration of the vehicular static eliminator 34A attached to the lid 26 of the fuse box 24 has been described, but the vehicular static eliminator 32 that is attached to the outer surface of the inverter case 22A and the vehicular static eliminator 33 that is attached to the outer surface of the battery case 23A have configurations similar to that of the vehicular static eliminator 34, and thus descriptions thereof are omitted.

In the vehicle 100 of the embodiment, the vehicular static eliminators 32, 33, and 34 are respectively attached to the lid of the inverter case 22A that contains the inverter 22, the lid or the side surface of the battery case 23A that contains the battery 23, and the lid 26 of the fuse box 24, which are charged with positive static electricity, so that it is possible to reduce the electrostatic induction to the hood 13 that is disposed close thereto. Accordingly, it is possible to cause the vehicle 100 to exhibit the original control performance by preventing the hood 13 from being charged to thereby reduce the potential of the vehicle body 10, and preventing the potential of the vehicle body 10 from affecting the control system and the sensor. Moreover, it is possible to prevent the outer surface of the vehicle body 10 being charged with positive static electricity, so that it is possible to cause the vehicle to exhibit the original aerodynamic performance by reducing the generation of the separated flow on the surface of the hood 13.

In the description in the foregoing, the coversheet 36 including the Japanese paper 36A has been described, but the coversheet 36 is not limited thereto and only needs to include natural fiber having a moisture-retaining property and air permeability, and may include cotton nonwoven fabric, for example.

Moreover, in the description in the foregoing, the self-discharge static eliminating device 35 including the conductive aluminum adhesive tape 35A and the metallic coated film 35B has been described, but the self-discharge static eliminating device 35 is not limited thereto. For example, the self-discharge static eliminating device 35 may include a carbon coated film obtained by directly applying a carbon coating material containing carbon particles, instead of aluminum wafer particles, to the outer surface of the lid 26. Moreover, without coating the surface, the surface of the aluminum adhesive tape 35A is subjected to a knurling process and a hairline process to form extremely fine protrusions.

Moreover, the vehicle 100 in which the vehicular static eliminators 32, 33, and 34 are respectively attached to the lid of the inverter case 22A, the lid or the side surface of the battery case 23A, and the lid 26 of the fuse box 24, which are disposed in the interior of the front compartment 11 has been described, but the embodiment is not limited thereto. For example, the vehicular static eliminator 34 may be attached to a top surface of the drive unit 21 that is mounted in the front compartment 11, or may be attached to a top surface or a side surface of another instrument, such as an air-flow sensor. Moreover, the vehicular static eliminator 34 may be attached to another instrument that is mounted in a rear compartment rearward of the vehicle 100, such as an auxiliary machine battery case. In this case, it is possible to reduce the potential of a rear hood that covers the rear compartment disposed close to the instrument. Here, the rear hood is a structure member of the vehicle body 10.

The invention claimed is:

1. A vehicular static eliminator, comprising:
a self-discharge static eliminating device that is attached to an outer surface of an instrument mounted in a vehicle body; and
a coversheet that is overlapped with an external surface of the self-discharge static eliminating device and covers the external surface, and covers side end surfaces of the self-discharge static eliminating device, wherein
the coversheet includes natural fiber.

2. The vehicular static eliminator according to claim 1, wherein the coversheet includes an adhesive layer having air permeability, and is stuck to the external surface of the self-discharge static eliminating device and the outer surface of the instrument via the adhesive layer.

3. The vehicular static eliminator according to claim 2, wherein
a plurality of the coversheets each including the adhesive layer and being overlapped with each other are stuck to the external surface of the self-discharge static eliminating device and the outer surface of the instrument, and
a total thickness of the plurality of the coversheets is 0.1 to 0.2 mm.

4. The vehicular static eliminator according to claim 1, wherein a circumferential edge portion of the coversheet is fixed to the outer surface of the instrument at outer sides of the self-discharge static eliminating device to sandwich the self-discharge static eliminating device between the coversheet and the instrument.

5. The vehicular static eliminator according to claim 1, wherein the coversheet includes Japanese paper or cotton nonwoven fabric.

6. The vehicular static eliminator according to claim 2, wherein the coversheet includes Japanese paper or cotton nonwoven fabric.

7. The vehicular static eliminator according to claim 3, wherein the coversheet includes Japanese paper or cotton nonwoven fabric.

8. The vehicular static eliminator according to claim 4, wherein the coversheet includes Japanese paper or cotton nonwoven fabric.

9. A vehicle comprising:
an instrument mounted in a vehicle body; and
a vehicular static eliminator including a self-discharge static eliminating device attached to an outer surface of the instrument, and a coversheet that is overlapped with an external surface of the self-discharge static eliminating device and covers the external surface, and covers side end surfaces of the self-discharge static eliminating device, wherein
the instrument is disposed close to a structure member of the vehicle body, and
the coversheet includes natural fiber.

10. The vehicle according to claim 9, wherein
the instrument includes at least one of a fuse box, a battery, and an inverter being mounted in a front compartment of the vehicle body, whose top surface is covered with a hood,
the fuse box, the battery, and the inverter are disposed close to the hood, and
the vehicular static eliminator is attached to at least one of a lid of the fuse box, a lid or a side surface of a battery case that contains the battery, and a lid of an inverter case that contains the inverter.

11. The vehicle according to claim 9, wherein the coversheet includes Japanese paper or cotton nonwoven fabric.

12. The vehicle according to claim 10, wherein the coversheet includes Japanese paper or cotton nonwoven fabric.

* * * * *